Feb. 11, 1930. G. H. MOURAR 1,747,139
MACHINE FOR COLLECTING SMALL STONES
Filed Aug. 17, 1925  3 Sheets-Sheet 2
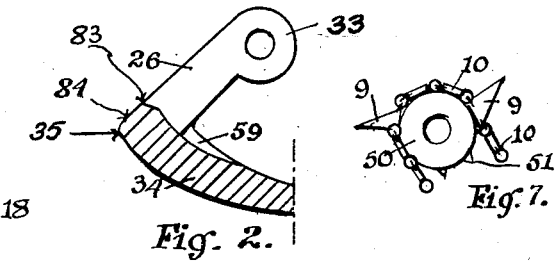
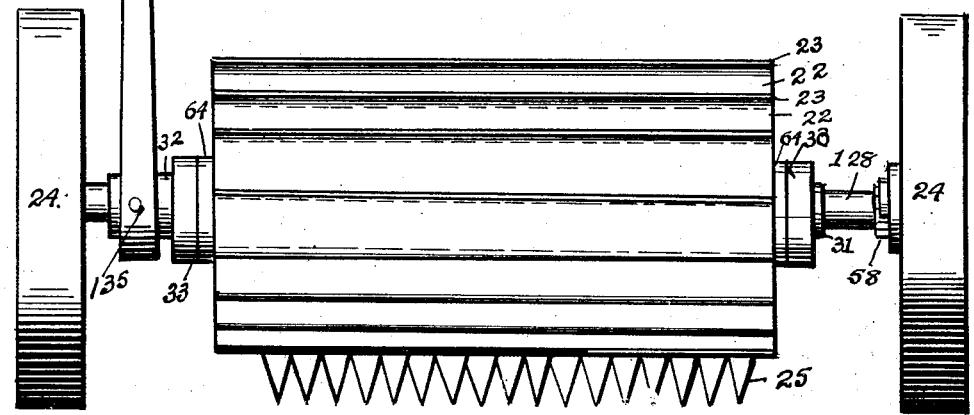
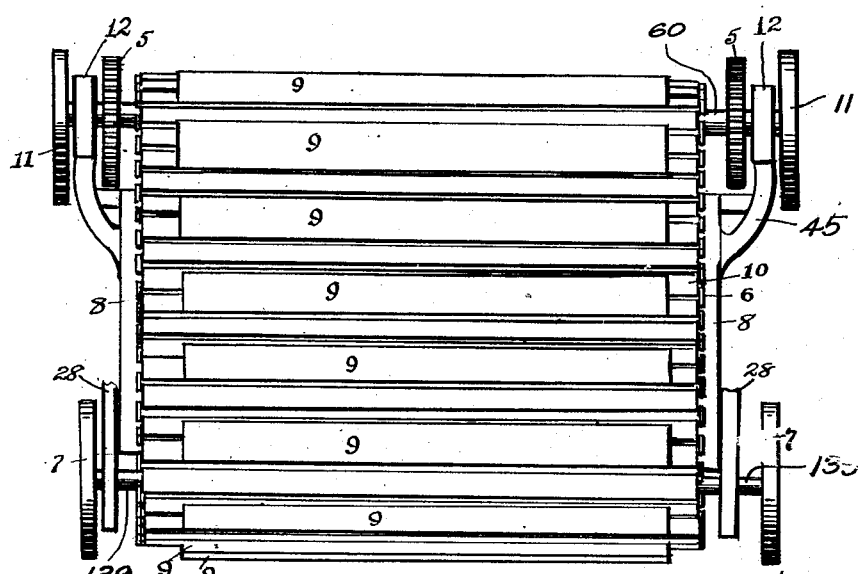
Inventor,
George H. Mourar
per. his atty. Mark W. Collet Feb. 11, 1930.                G. H. MOURAR                1,747,139
                    MACHINE FOR COLLECTING SMALL STONES
                           Filed Aug. 17, 1925        3 Sheets-Sheet 3
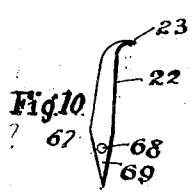
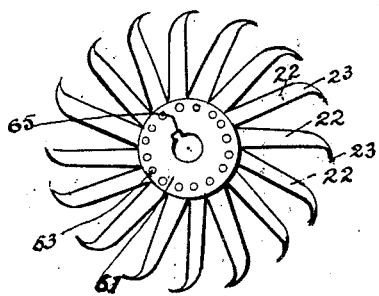
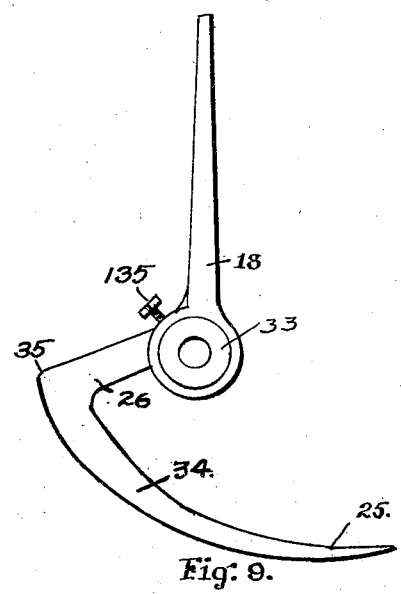
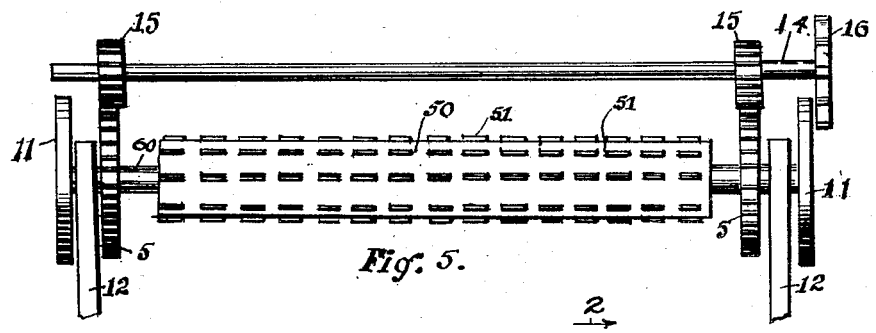
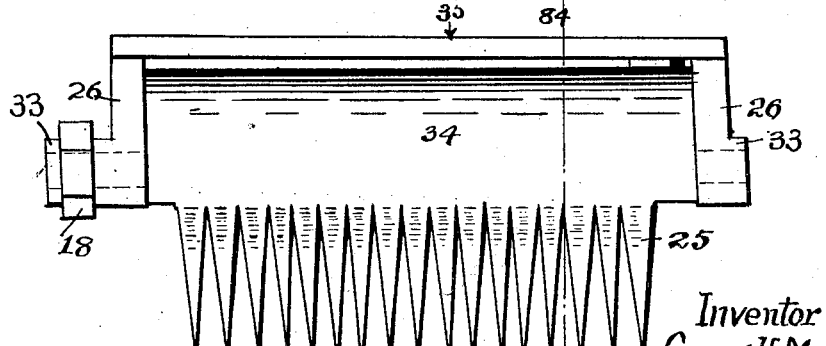
Inventor
George H. Mourar.
by his atty Mark W. Colla Patented Feb. 11, 1930

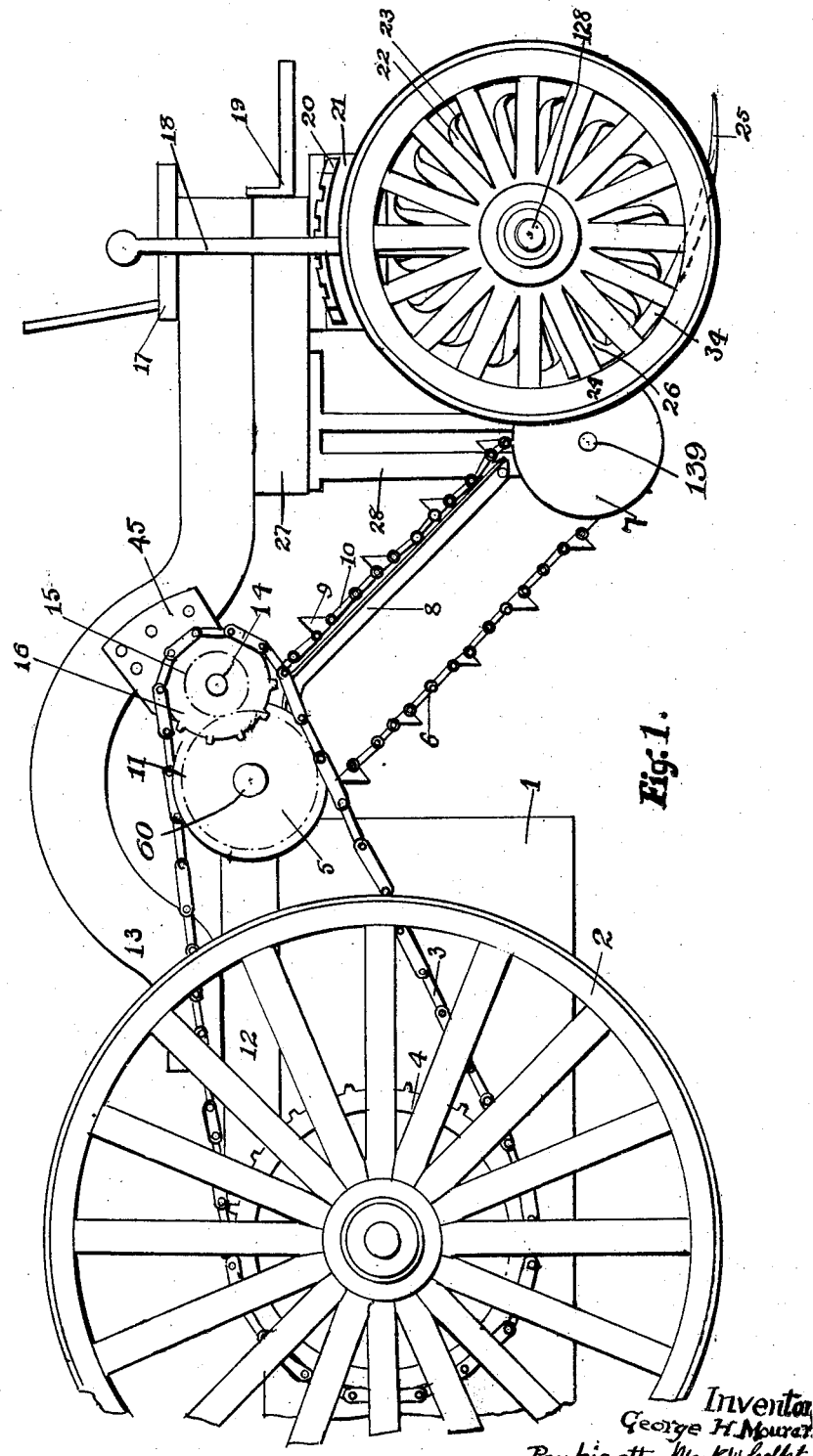

1,747,139

UNITED STATES PATENT OFFICE

GEORGE H. MOURAR, OF POTTSTOWN, PENNSYLVANIA

MACHINE FOR COLLECTING SMALL STONES

Application filed August 17, 1925. Serial No. 50,809.

Small stones on the surface or near the surface of the soil are very objectionable, especially in cultivated fields. They are on the other hand very useful to farmers, if collected, because they can be used on farm roads, making them easy for automobile vehicles to use in wet weather, in concrete and many other uses. While the collection of large stones from fields by manually picking them up and throwing them into a cart or barrow is practicable, the cost of collecting small stones in such manner is prohibitive. My machine, while being driven over the ground will gather up practically all the small stones lying on or near the surface of the soil, and collect them automatically in a receptacle. It can be managed by one man, and is suitable for use with either horses or a tractor. The stones will usually be clean and suitable for any use, in mixing concrete or other use requiring clean stone to supply which the farmer often buys crushed rock when his fields contain plenty of suitable small stone that it is too expensive to collect by present methods.

Fig. 1 is a side elevation of the machine; Fig. 2 is a section on line 2—2 of Fig. 6. Fig. 3 is an elevation of the front wheels and axle with the parts mounted thereon viewed from the front; Fig. 4 is an elevation of the stone lifter viewed from the front. Fig. 5 is part of the operating mechanism for the stone lifting apron; Fig. 6 is a plan view of the scoop. Fig. 7 is a side elevation of the upper barrel of the stone lifting mechanism. Fig. 8 is a side elevation of the stone driver. Fig. 9 is a side elevation of the scoop and Fig. 10 a rake removed from the stone driver.

The machine is of the four wheeled wagon type, the front axle 128 swivelling, and being provided with the wheels 24, one of which is provided with the differential 58 and the other of which is secured solidly to the axle. A rear wheel 2 drives the stone lifting apron 6. The scoop 34 and stone driver 26 (described more fully later) are carried by the front axle. The stone lifting apron 6 and a stone collecting box 1 placed at the discharge end of the apron 6, are carried from the frame of the wagon. The devices for driving the lifting apron 6, are in practice a sprocket wheel 4, turning with the wheel 2, a chain 3 passing over the sprocket wheels 16 and 2 and driving the wheel 16 which last is geared by gears 15 and 5 to the axle 60 of a spool 50 (see Fig. 5) that carries one extremity of the lifting apron 6. The axle 14 of the sprocket wheel 16 can be supported on either side of the machine by a bracket, as 45, from a sill 13. The disc 11 may be mounted on the ends of the axle 60.

The axle 60 and the support 8 may be carried by the portion 12, of the sill. The support 8 aids in stiffening the lifting apron 6. The lower spool for the apron 6 is carried from a hanger 28 that can be secured to the sills 13, of the machine. The apron 6 is driven by the cogs 51 that catch between the transverse bars of the apron 6 and drive it. The apron 6, in practice, is composed of transverse bars, shackled together at their sides; certain of these bars 9 projecting beyond the remaining bars 10 and forming transverse rakes by which the lifting of the small stones by the apron 6 is made effective. The receiving extremity of the apron 6 is positioned to be immediately adjacent to the position the discharge 35 of the scoop 34 will occupy when the machine is gathering the small stones. The axle 139 having bearings in the bracket 28, carries the lower spool of the apron 6. This bracket is shown secured to the block 27 that is fastened to the sills 13.

The stone gathering mechanism is as follows:—The scoop 34 swivels with the front wheel truck. Its discharge edge 35 which lies closely adjacent to the lower extremity of the lifting apron 6, when the machine is moving in a substantially straight line and is gathering stones, can be swung well away from this apron whereby the turning of the machine is facilitated, and moreover by this same movement, the whole scoop can be elevated above the surface of the soil sufficiently to allow the machine to be driven readily over moderately rough ground. In practice, these adjustments are made simultaneously by one turning movement of the scoop 34 on the axle 128. The turning of the scoop 34 on the axle 128 also regulates the extent of the penetration of the teeth 25 of the scoop 34 into the soil, as will appear from the description below.

In practice, the scoop 34 has the hubs 33 that have bearings on the axle 128 of the front wheel truck (see particularly Figs. 6 and 9) and rocks freely on these bearings. The arm 18 is mounted on one hub 33, and is controlled by a quadrant 20 and both arm and quadrant are mounted on the fifth wheel block 21. The position of the arm 18 on the hub 33 is fixed by the set screw 135. The general contour of the scoop 34 viewed from the side is scythe shaped, and the ends of the teeth 25 are substantially further away from the axle 128 than is the discharge edge 35. As the scoop is rocked backward the portion of it that is adjacent to the surface of the soil, approaches nearer to this surface, and, when the discharge edge 35 becomes positioned close to the lower extremity of the apron 6, and in position to discharge the stones upon it, the ends of the teeth 25 are at or slightly beneath the surface of the soil. As is readily seen (see especially Fig. 1) a considerable variation in the depth of penetration of the soil can be made without interfering with the action of discharging the stones, especially as in my preferred proportions of these devices, the sum of the radius of the lower spool, the width of a bar 9, and the distance from the discharge edge 35 to the axle 128, is a little less than the distance between the axle 128 and the axle 139, (see Fig. 1) and the contour of the upper portion of the scoop 34 being nearly the contour of a portion of a cylinder, the axis of which is the axis of the rocking movement of the scoop 34.

In the preferred construction of the scoop 34 is shown, particularly in Figs. 6, 2 and 9 (Fig. 3 showing it combined with the stone driver), the portion of the scoop 34 between the forward end of the teeth 25 and the discharge end of the scoop is substantially scythe shaped in cross section (see Fig. 9), the two bounding curves being each at a greater radial distance from the axis of suspension of the scoop towards the front or tooth end of the scoop than at its discharge end. A very small turning of the scoop on its bearings in the hub 33, will produce a substantial change in the depth of the penetration of its teeth into the soil, and will not affect practically at all the delivery of the stone from it to the lifting apron 6. When the machine is gathering the stone, the discharge edge 35 of the scoop 34 should as nearly as possible be on a level with and close to the most forward portion of the path traversed by the apron rakes 9. Among other things, this relative position of the scoop 34, and the apron 6, will aid in lessening the rocking of the scoop required to remove it from the apron 6, sufficiently to permit the free swivelling of the front truck of the machine. The incline (see Figs. 2 and 6) causes the stones driven over the edge 83 by the driver 61, to pass by gravity to the stone lifting apron 6. The arms 26, connect the scoop 34 with the hubs 33. The teeth 25 extending forward from the main portion of the scoop penetrate into the soil and lying almost horizontally permit most of the earth dug up by them to sift out between them, leaving the stones nearly clean. The driving of the stones by the driver will also tend to clean the stones. The fin 59 at each side of the scoop aids in holding the stones on the scoop.

The stone driver has its rakes 22 so set that they will rotate with their ends 23 close to the forward face of the scoop 34 at the portion thereof towards the delivery edge 35. The outer ends 23 of the rakes 22, are curved in the direction of the driver's rotation so that the stones collected on the scoop will not become lodged between the rakes 22 and the face of the scoop. A practical construction of the driver is illustrated (see especially Figs. 8 and 10). In this construction each rake 22 has a wedge shaped rear portion 69. The faces of these wedge shaped portions fit against each other from the point 67 inwards; they are held in place by the rods 63 which pass through apertures in the retainers 61 and through apertures 68 in the rakes 22 that are secured to the axle 128 by a key in the key way 65. Usually the driver rakes will engage with the top stones lying on the scoop near the back end of the teeth 25, which stones are nearly clear of earth and drive them up the incline of the scoop toward the edge 35, during which passage almost all of the earth is shaken off and slides down between the rakes and the inner surface of the scoop 34.

The scoop 34 and stone driver are positioned, in practice, on the front axle 128 by the collars 64 that are secured to the axle 128 and turn with it. The stone driver is positioned between them. The collars 32 and 36 can be mounted on the hubs 33 if a wider side bearing is desired than that which would be given by the ends of the hubs alone. A driver seat 17 and a foot rest 19 may be provided. The sill 13 is, in practice, arched so as to provide room for the apron without raising the body frame of the machine too high.

The machine can be driven to the field where the stone is to be gathered, with the rod 18 pushed back so as to clear the back of the scoop well away from the apron 6, and to raise the teeth of the scoop well off the ground, so that the vehicle can be moved and turned freely. The rod 18 can be moved forward, as soon as the field is reached, so as to move the delivery of the scoop toward the receiving end of the apron, and to lower the teeth 25 into position to gather the stone. Most of the earth gathered up with them will fall through between the teeth. The stones will collect on the scoop and will be driven forward by the rakes towards the delivery of the scoop. While this occurs, the earth will fall backward and practically none of it will be delivered to the apron. The stones delivered to the apron will be carried by the apron rakes upward until they pass off the delivery of the apron into the receptacle 1.

The particular constructions shown in the frame of the vehicle are not limitations on my invention, and many changes may be made in other details of construction of the machine without departing from my invention.

I claim:

1. In a small stone collecting machine of the four wheel wagon type, having a swivelling front wheel truck, the main frame of said machine carrying a receptacle for the stones, and also a lifting apron discharging the stones into said receptacle, said lifting apron being driven by the revolution of a rear wheel of the machine, the combination with a swivelling front wheel truck comprising a front axle rotating with one front wheel, a scoop with forwardly projecting teeth and arms extending from the rear portion of the scoop to suspension bearings on the front axle, the rear of the scoop opening toward the lower end of the apron, means for swinging the scoop towards and away from the apron on said suspension bearings and a stone driver whose axis is concentric with the axis of the front axle and which turns with the axle of the same, and provided with rakes engaging with the stones collected in the scoop and pushing them backward toward the rear opening of the scoop.

2. In a four wheel wagon type machine for collecting small stones, in which the body sills are carried by four wheels, the forward wheels being mounted on a swivelling truck, the combination with a stone receptacle of an inclined lifting apron, carried from said sills and provided with transverse rakes and turning upon spools, one of which is driven from a rear wheel, said lifting apron discharging into said stone receptacle, a scoop carried by and turning upon the axle of the front truck, a stone driver driven by said axle, the scoop and stone driver turning about the same axis as the axle.

3. The device as defined in claim 1, wherein the discharge end of said scoop is adjustable with respect to the receiving end of the lifting apron.

4. The device as defined in claim 1 wherein the scoop is scythe shaped in cross section and the forward portion thereof is at a greater radial distance from the axle of the front wheel truck than is the discharge end of said scoop.

5. The device as defined in claim 1, wherein the scoop is formed with a solid body toward the discharge end thereof from which teeth project forward.

6. The device as defined in claim 1, wherein the edges of the rakes of the stone driver approach nearer the surface of the scoop as they approach the discharge end thereof.

GEORGE H. MOURAR.